United States Patent [19]

Kruse et al.

[11] 4,185,049

[45] Jan. 22, 1980

[54] MASS POLYMERIZATION PROCESS FOR POLYBLENDS

[75] Inventors: Robert L. Kruse, Springfield; Fred M. Peng, Longmeadow, both of Mass.

[73] Assignee: Monsanto Company, St. Louis, Mo.

[21] Appl. No.: 701,844

[22] Filed: Jul. 1, 1976

[51] Int. Cl.$^2$ ............................................. C08F 279/02
[52] U.S. Cl. ............................................................ 525/84
[58] Field of Search ............................ 260/878 R, 880 R

[56] References Cited

U.S. PATENT DOCUMENTS

| | | | |
|---|---|---|---|
| 3,385,911 | 5/1968 | Harris | 260/880 R |
| 3,627,855 | 12/1971 | Schott | 260/880 R |
| 3,855,354 | 12/1974 | Takizawa | 260/880 R |
| 3,879,495 | 4/1975 | Fujii | 260/880 R |
| 3,927,142 | 12/1975 | Strobel | 260/878 R |
| 3,957,911 | 5/1976 | Higgins | 260/880 R |

*Primary Examiner*—Paul R. Michl
*Attorney, Agent, or Firm*—Joseph S. Nelson; William J. Farrington; Edward P. Grattan

[57] ABSTRACT

The invention relates to an improved process for the mass polymerization of solutions comprising monoalkenyl aromatic monomers and optionally monoalkenyl nitrile monomers having a diene rubber dissolved therein wherein the improvement comprises dissolving a minor amount of an aliphatic mono-olefinic compound in said solution and mass polymerizing said solution, said olefinic compound forming free radicals with said monoalkenyl aromatic monomer that are more active than said monoalkenyl aromatic free radicals in grafting said rubber provided a higher grafted rubber phase.

1 Claim, No Drawings

MASS POLYMERIZATION PROCESS FOR POLYBLENDS

BACKGROUND OF THE INVENTION

As is well known, polyblends of rubber with monoalkenyl aromatic polymers have significant advantages in providing compositions of desirable resistance to impact for many applications. Various processes have been suggested or utilized for the manufacture of such polyblends including emulsion, suspension and mass polymerization techniques, and combinations thereof. Although graft blends of a monoalkenyl aromatic monomer and rubber prepared in mass exhibit desirable properties, this technique has a practical limitation upon the maximum degree of conversion of monomers to polymer to polymer which can be effected because of the high viscosities and accompanying power and equipment requirements, which are encountered when the reactions are carried beyond a fairly low degree of conversion after phase inversion takes place. As a result, techniques have been adopted wherein the initial polymerization is carried out in mass to a point of conversion beyond phase inversion at which the viscosity levels are still of practical magnitudes, after which the resulting prepolymerization syrup is suspended in water or other inert liquid and mass polymerization of the monomers carried to substantial completion.

Stein, et.al. in U.S. Pat. No. 2,862,906 discloses a mass suspension method of polymerization styrene having diene rubbers dissolved therein with the rubber being grafted, inverted and dispersed as rubber particles under agitation. After phase inversion, the viscous mixture is suspended in water and mass polymerization is completed producing a polyblend in the form of beads.

Such mass suspension processes are used commercially, however, present the economic problems of batch operations requiring long cycles at relatively low temperatures to control the heat of polymerization. Continuous mass polymerization processes have great economic advantages if they can be run at higher temperatures and higher rates with the necessary control of the great heats of polymerization. In the case of polyblends, the dispersed rubber phase must be formed and stabilized as to its morphology, bringing it through the continuous polymerization of the rigid matrix polymer phase so that the physical properties of the polyblend meet exacting property specifications.

Various methods have been developed for the continuous mass polymerization of polyblends. Ruffing, et.al., in U.S. Pat. No. 3,243,481 disclose a process wherein diene rubbers are dissolved in predominantly monovinylidene aromatic monomers and polymerized in four reaction zones.

U.S. Pat. No. 3,903,202 discloses a process of the continuous mass polymerization of polyblends using two reactors as a more simple process for mass polymerizing such polyblends.

Hence, the mass polymerization of rubber-monomer solutions by batch or continuous mass polymerization are known as well as batch mass-suspension processes in that the suspended droplets polymerize by mass polymerization kinetics and the beads formed are minature mass polymerization systems. The present process then is adaptable to mass polymerization processes of the type described.

The above processes all produce polyblends that have a dispersed and grafted rubber phase. It has been found that the polyblends are toughened by the rubber phase in direct proportion to the rubber content. Beyond the rubber content it has been found that the efficiency of the rubber in toughening is greatly enhanced by grafting the rubber with the polymer of the matrix phase to provide an interfacial compatibility between the rubber phase and the matrix phase.

Generally, the rubber is grafted from about 10 to 100 percent with the matrix monomers with the rubber as a substrate and the graft monomers forming graft polymers as superstrate.

Prior art processes have used free radical catalysts to promote polymerization of the monomers and also extract the allylic hydrogen from the rubber so that the monomers would graft to the rubber more efficiently.

It has been found that higher levels of graft are formed by using higher levels of catalyst, however, the increased use of catalyst lowers the molecular weight of the matrix phase giving a net lowering of impact strength. Hence, a need exists for a process that will increase the grafting of the rubber phase yet allows the matrix phase polymers to reach optimum molecular weights consistent with optimum physical properties.

It is the objective of the present invention to provide an improved mass polymerization process for rubber-monomer solutions that will provide maximized grafting of the rubber phase in conjunction with an optimized matrix phase molecular weight giving polyblends with improved physical properties.

SUMMARY OF THE INVENTION

It has been found that the above objective can be accomplished by the present process which relates to an improved process for the mass polymerizing of a solution comprising a monoalkenyl aromatic monomer having a diene rubber dissolved therein wherein the improvement comprises:

A. dissolving a minor amount of a aliphatic mono-olefinic compound in said solution,
B. mass polymerizing said solution at temperatures of from about 80°–180° C., with agitation,
C. forming polymer molecules of said monomers as a matrix phase having dispersed therein a diene rubber phase as rubber particles grafted with and having occluded at least a portion of said polymer molecules, said olefin compound being selected such that, during polymerization, said olefinic compound forms free radicals with said monoalkenyl aromatic monomer that are more active than a monoalkenyl aromatic free radical in chain transfer with said rubber increasing the grafting of said rubber with said polymer molecules.

PREFERRED EMBODIMENTS

Monomers

The monomer used in the present invention comprises at least one monoalkenyl aromatic monomer of the formula:

where Ar is selected from the group consisting of phenyl, halophenyl, alkylphenyl and alkylhalophenyl and mixtures thereof and X is selected from the group consisting of hydrogen and an alkyl radical of less than three carbon atoms.

Exemplary of the monomers that can be employed in the present process are styrene; alpha-alkyl monovinylidene monoaromatic compounds, e.g. alpha-methylstyrene, alpha-ethylstyrene, alpha-methylvinyltoluene, etc.; ring-substituted alkyl styrenes, e.g. vinyl toluene, o-ethylstyrene, p-ethylstyrene, 2,4-dimethylstyrene, etc.; ring-substituted halostyrenes, e.g. o-chlorostyrene, p-chlorostyrene, o-bromostyrene, 2,4-dichlorostyrene, etc.; ring-alkyl ring-halo-substituted styrenes, e.g. 2-chloro-4-methylstyrene, 2,6-dichloro-4-methylstyrene, etc. If so desired, mixtures of such monovinylidene aromatic monomers may be employed.

The process can also be used to polymerize monomer solution of a diene rubber wherein comonomers are used with the monoalkenyl aromatic monomers, in particular the alkenyl nitrile monomers such as acrylonitrile and methacrylonitrile and mixtures thereof. Here, such monomer solutions comprise about 60 to 99 percent by weight of the monoalkenyl aromatic monomer, 1 to 39 percent by weight of an alkenyl nitrile monomer and about 1 to 20 percent by weight of said diene rubber, forming monoalkenyl aromatic copolymer polyblends of said solution composition.

In addition to the monomers to be polymerized, the formulation can contain catalyst where required and other desirable components such as stabilizers, molecular weight regulators, etc.

The polymerization may be initiated by thermal monomeric free radicals, however, any free radical generating catalyst may be used in the practice of this invention including actinic irradiation. Conventional monomer-soluble peroxy and perazo catalysts may be used. Exemplary catalysts are di-tert-butyl peroxide, benzoyl peroxide, lauroyl peroxide, oleyl peroxide, toluyl peroxide, di-tert-butyl diperphthalate, tert-butyl peracetate, tert-butyl perbenzoate, dicumyl peroxide, tert-butyl peroxide isopropyl carbonate, tert-butyl hydroperoxide, cumene hydroperoxide, p-menthane hydroperoxide, cyclopentane hydroperoxide, pinane hydroperoxide, etc., and mixtures thereof.

The catalyst is generally included within the range of 0.001 to 3.0 percent by weight, and preferably on the order of 0.005 to 1.0 percent by weight of the polymerizable material, depending primarily upon polymerization temperatures.

As is well known, it is often desirable to incorporate molecular weight regulators such as mercaptans, halides and terpenes in relatively small percentages by weight, on the order of 0.001 to 1.0 percent by weight of the polymerizable material. From 2 to 20 percent diluents such as ethylbenzene, ethyltoluene, ethylxylene, diethylbenzene or benzene may be added to the monomer composition to control viscosities at high conversions and also provide some molecular weight regulation. In addition, it may be desirable to include relatively small amounts of antioxidants or stabilizers such as the conventional alkylated phenols. Alternatively, these may be added during or after polymerization. The formulation may also contain other additives such as plasticizers, lubricants, colorants and non-reactive preformed polymeric materials which are suitable or dispersible therein.

Rubbers

The diene rubbers used are those soluble in the monomers described. The preferred diene rubbers are those having a second order transition temperature not higher than 0° centigrade, preferably not higher than −20° centigrade, as determined by ASTM Test D-746-52T of one or more of the conjugated, 1,3 dienes, e.g. butadiene, isoprene, cyclopentadiene-1,3, 1 and 2-chloro-1,3-butadiene, piperylene, etc. Such rubbers include copolymers and block copolymers of conjugated 1,3-dienes with up to an equal amount by weight of one or more copolymerizable monoethylenically unsaturated monomers, such as monovinylidene aromatic hydrocarbons (e.g. styrene; an aralkylstyrene, such as the o-, m- and p-methylstyrenes, 2,4-dimethylstyrene, the arethylstyrenes, p-tert-butylstyrene, etc.; an alphamethylstyrene, alphaethylstyrene, alpha-methyl-p-methyl styrene, etc.; vinyl naphthalene, etc.); arhalo monovinylidene aromatic hydrocarbons (e.g. the o-, m- and p-chlorostyrene, 2,4-dibromostyrene, 2-methyl-4-chlorostyrene, etc.); arcylontrile; methacrylonitrile; alkyl acrylates (e.g. methyl acrylate, butyl acrylate, 2-ethylhexyl acrylate, etc.), the corresponding alkyl methacrylates; arcylamides (e.g. acrylamide, methacrylamide, N-butylacrylamide, etc.); unsaturated ketones (e.g. vinyl methyl ketone, methyl isopropenyl ketone, etc.); alpha-olefins (e.g. ethylene, propylene, etc.); pyridines; vinyl esters (e.g. vinyl acetate, vinyl stearate, etc.); vinyl and vinylidene halides (e.g. the vinyl and vinylidene chlorides and bromides, etc.); and the like.

Although the rubber may contain up to about 2.0 percent of a crosslinking agent, based on the weight of the rubber-forming monomer or monomers, crosslinking may present problems in dissolving the rubber in the monomers for the graft polymerization reaction. In addition, excessive crosslinking can result in loss of the rubbery characteristics.

A preferred group of rubbers are the stereospecific polybutadiene rubbers formed by the polymerization of 1,3-butadiene. These rubbers have a cis-isomer content of about 30–98 percent and a trans-isomer content of about 70–2 percent and generally contain at least about 85 percent of polybutadiene formed by 1,4 addition with no more than 15 percent by 1,2 addition. Mooney viscosities of the rubber (ML-4, 212° F.) can range from about 20 to 70 with a second order transition temperature of from about −50° to −105° C. as determined by ASTM Test D-746-52T.

Aliphatic Mono-Olefinic Compounds

The improved process is based on the concept of using minor amounts of a mono-olefinic compound in conjunction with the matrix monomers disclosed. Such mono-olefinic compounds can be substituted or unsubstituted mono-olefinic compounds and are selected such that when they add to the growing alkenyl aromatic chain that they form a more reactive radical than the alkenyl aromatic radical and will more readily extract an allylic hydrogen from the dissolved rubber molecules so that rubber is more readily grafted. Generally, the monoalkenyl aromatic monomers are reactive monomers because of their conjugated structure, however, an alkenyl aromatic monomer free radical at the end of a growing chain is stabilized by resonance and is relatively unreactive and does not readily extract allylic hydrogen from a rubber molecule to initiate grafting. In the same context, the mono-olefinic compounds generally lack conjugation and are less active as monomers yet when they add to a growing chain, not being resonance stabilized, they provide extremely active free radicals that can attach the rubber chains extracting hydrogen, hence, initiating more grafting cites to increase the graft level of the rubber. Since such olefinic compounds do not polymerize readily with themselves, but do readily polymerize with the alkenyl aromatic growing chains, only minor amounts are needed to produce sufficient highly reactive free radicals to promote grafting, e.g., from about 0.01 to 5 percent by weight based on the solution.

The mechanism by which the sluggish olefinic compounds produce very active free radicals is not completely understood. Resonance stabilization is considered to be a factor but is not always predictable in that steric hinderance and the polarity of the unsaturated double bond can also be a factor in the polymerization of such materials.

It has been found unexpectedly that the following monoolefinic compounds when dissolved in a rubber-monomer solution, wherein the major portion of the monomer is an alkenyl aromatic monomer, that higher levels of graft are obtained. Such monoolefinic compounds are selected from the group consisting of those that will form free radicals with said mono-alkenyl aromatic monomer that are more active than said monoalkenyl aromatic free radical in chain transfer with said rubber.

Preferably, the aliphatic mono-olefinic compounds are those that have low resonance stabilization that will preferably add to a monoalkenyl aromatic monomer having high resonance stabilization, hence, producing a very reactive radical that will cause chain transfer with the rubber removing the allylic hydrogen forming a free radical on the rubber molecule and will graft styrene monomer readily. Such compounds are, for example, ethylene, propylene, butene-1, hexene-1, vinyl acetate, allyacetate, ethylvinyl ether and compounds of the type having low resonance stability and low polarization of the unsaturated double bond.

Process

It is known to polymerize styrene monomer in the presence of dissolved diene rubbers in stirred tank reactors to form polyblends of styrene grafted rubber and polystyrene. As the styrene polymerizes to polystyrene it forms a monomer-polymer solution as a separate phase in the monomer-rubber solution phase. Some of the polystyrene grafts onto the rubber forming a grafted rubber in the monomer-rubber phase.

The monomer-polymer phase increases in volume with conversion of the styrene monomer and as that volume becomes larger than the monomer-rubber phase then an inversion occurs with the monomer-rubber phase dispersing as monomer-rubber droplets in the monomer-polymer phase. The grafted rubber exists at the interface of the droplet acting as a surfactant helping disperse and stabilizing the monomer-rubber droplets. The agitation of the stirred reactor aids the inversion phenomenon and helps size the monomer-rubber droplets. This agitation must be sufficient to both create shearing agitation and produce agitation throughout the entire polymerizing mixture to insure homogeneity both as to the mixture and its temperature. The agitation must insure sufficient shearing action to size and disperse the monomer-rubber globules. Such agitation will vary with the size of the vessel, the type of agitator and viscosity of the mixture.

Stein, et.al. in U.S. Pat. No. 2,862,906 disclose a process for mass polymerizing polystyrene in the presence of diene rubber in a first stirred tank reactor up through the phase inversion of the rubber and then suspending the partially polymerized syrup or prepolymer in water in a second reactor and completing the mass polymerization realizing excellent heat control and producing a polyblend in the form of beads. Such processes are used commercially but present the problem of batch operations.

The prepolymerization step is very important in providing a polyblend with superior physical properties of molding and sheet products. Here, the impact strength or toughness and gloss of the fabricated article are of primary importance. Both impact strength and gloss are dependent on the rubber particle properties and the amount used in the polyblend. Small particles give good gloss but low toughness whereas large particles give good toughness but low gloss. A balance is realized in a optimum product by controlling the particle size and the amount of grafted styrene within the particle. These monomer-rubber particles are formed in the first reactor and become stabilized by grafting. When the prepolymer is suspended in water they then polymerize progressively under uniform temperatures with the matrix phase in the suspended bead much as in a mass process.

The monomer-rubber particles contain grafted rubber but also occluded polymer formed by polymerization of the monomer in the droplet as polymer. The amount of grafted polymer can vary in the rubber droplets which form discrete rubber particles as all of the monomer is polymerized, said grafted and occluded polymer being present in the rubber particle in a preferred amount of about 1 to 5 parts for each part of rubber.

The monomer-rubber droplet then polymerizes as a separate system in the monomer-polymer phase each developing a progressively larger polymer phase as conversion of the monomer is carried out. The occluded polymer in the rubber particle is an important feature of the morphology of the particle. Some of the rubber is grafted which stabilizes its dispersion in the polyblend matrix. Some of the polymer being formed crosslinks the rubber particle insuring its particle size integrity so important to physical properties. The rest of the occluded polymer serves as a filler or extender for the rubber particle giving it a higher efficiency as a rubber phase in toughening polyblends particularly those of the polystyrene family of polymers such as impact polystyrene and ABS polyblends.

Because of the critical nature of the rubber particle phase, it must be formed correctly in the first prepolymerization reactor as described and then that structure or morphology must be maintained in any further polymerization system used to complete the polymerization. The batch mass-suspension system of Stein, et.al. preserves the rubber structure using a suspension reaction system to gradually polymerize the remaining monomers. The prepoly syrup is generally suspended at 10 to 40 percent conversion and gradually mass polymerized to full conversion as beads. Here, the monomer polymerizing in the monomer-rubber phase and the monomer-polymer phase are polymerizing at the same rate and monomer concentrations in each phase remain about the same with no extraction of critical monomer from the rubber phase to lower its occluded polymer content.

In developing a continuous process for the mass polymerizing monomer-rubber solutions one must consider the same process and product requirements to producing acceptable polyblends. It has been found that continuous mass polymerization in a stirred tank reactor can be run under steady-state polymerization conditions forming a dispersed rubber phase with a controlled feed of monomer-rubber solution and controlled withdrawal of partially polymerized syrup. The effluent of the first continuous stirred tank reactor can then be fed continuously to a staged isobaric stirred reactor as disclosed in U.S. Pat. No. 3,903,202 to further the polymerization yet preserve the morphology of the rubber phase particles. Both reactors are run at variable fillage so that products of varying and predetermined molecular weight can be made at any predetermined rate.

The staged isobaric reactor operates under substantially linear flow with progressive polymerization from the first to last stage. The prepolymerization syrup is fed to the first stage of the staged isobaric stirred reactor (SISR) and polymerizes under conversion levels only slightly higher than the continuous stirred tank reactor (CSTR). This is necessary to insure that the rubber phase maintains its morphology. If the prepolymerization syrup at 10 to 40 percent conversion were fed to a second continuous stirred tank reactor operating at 75 percent conversion there would be a substantial loss of monomer from the monomer-rubber droplets lowering the possible amounts of occluded polymer to be formed in the rubber particle. Prior art processes have overcome this problem by using a series of separated tower reactors each operating at a slightly higher conversion to progressively polymerize the monomer-polymer solution. Ruffing, et.al. in U.S. Pat. No. 3,243,481 uses a series of separated tower reactors to progressively polymerize polyblends containing rubber.

The SISR reactor provides staged polymerization in one reactor operating under constant but variable fillage and isobaric boiling conditions. The SISR provides means to remove monomer from all stages simultaneously allowing each stage to operate under controlled temperatures. Means to condense said vapors and bring them back into the first stages where the highest polyrates are realized are provided for highly efficient conversion of monomers per unit volume of reactor. The SISR provides shearing agitation to insure the uniformity of the viscous polymerizing mixture in each state maintaining the morphology of the rubber particles.

The present process can be adapted to any suitable mass polymerization process as described above and are incorporated by reference. The present process is an improved process for the mass polymerizing of a solution comprising a monoalkenyl aromatic monomer having a diene rubber dissolved therein wherein the improvement comprises:

A. dissolving a minor amount of a aliphatic mono-olefinic compound in said solution,
B. mass polymerizing said solution at temperatures of from about 80°–180° C., with agitation,
C. forming polymer molecules of said monomers as a matrix phase having dispersed therein a diene rubber phase as rubber particles grafted with and having occluded at least a portion of said polymer molecules, said olefin compound being selected such that, during polymerization, said olefinic compound forms free radicals with said monoalkenyl aromatic monomer that are more active than a monoalkenyl aromatic free radical in chain transfer with said rubber increasing the grafting of said rubber with said polymer molecules.

Step A of dissolving a minor amount of an aliphatic mono-olefinic compound in the monomer-rubber solution is carried out in the polymerization reactor after the solution has been charged. A gaseous olefin is purged into the solution under agitation and pressures of 1 to 5 atmospheres or greater if needed to insure the solubility needed to provide 0.01 to 5 percent by weight of said olefin in the solution at the temperature of polymerization, i.e. 80° to 180° C., preferably 100° to 150° C. Liquid olefins are mixed in under agitation providing concentration of 0.01 to 5 percent by weight based on the monomer solution. Preferably, the olefins are added initially before the solution is brought to polymerization temperatures, however, incremental or continuous adds may be made during the polymerization in a continuous polymerization cycle.

A monomer solution comprising a monoalkenyl aromatic monomer having about 1–20 percent by weight of a diene rubber dissolved therein is charged continuously as a monomer-rubber solution to a stirred reaction zone. A suitable reactor system is disclosed in U.S. Pat. No. 3,903,202. The monomer is polymerized at temperatures of about 110°–145° C. in the first reactor converting about 10–50 percent by weight of the monomer to a alkenyl aromatic polymer having a molecular weight of 150,000 to 500,000 $M_w$ preferably 200,000 to 300,000 $M_w$. At least a portion of the polymer polymerized is grafted as polymer molecules to the diene rubber as a superstrate.

Although the amount of polymeric superstrate grafted onto the rubber substrate may vary from as little as 10.0 parts by weight to 100.0 parts of substrate to as much as 500.0 per 100.0 parts and even higher, the preferred graft copolymers will generally have a superstrate to substrate ratio of about 100 to 250:100. With graft ratios about 150 to 250:100; a highly desirable degree of improvement in various properties generally is obtained.

The remainder of the polymer formed is dissolved in said monomer composition as polymerized forming a monomer-polymer solution. The monomer-polymer solution or phase is incompatible with the monomer-rubber solution or phase and phase separation is observed by the well known Dobry effect. As the polymer concentration of the monomer polymer-phase increases and has a volume slightly larger than the monomer-rubber phase, the monomer-rubber phase disperses as rubber-monomer particles aided by the shearing agitation of the stirred first reaction zone.

The agitation must be significant and of high enough shear to disperse and size the rubber particles uniformly throughout the monomer-polymer phase. The intensity of the stirring will vary with the size and geometry of the reactor, however, simple experimentation with a given stirred reactor will establish the sufficient amount of stirring needed to insure the homogeneous dispersion of the rubber particles throughout the monomer-polymer phase. The particle size of the rubber can be varied from a weight average particle diameter of from about 0.5 to 10 microns preferably from 0.5 to 5 microns to provide a balance between the impact strength and the gloss of the rubber reinforced polyblend. Higher stirring rates and shearing agitation can lower the size of the dispersed rubber particle, hence, must be controlled to provide sufficient stirring to size the particles to the predetermined size needed and insure homogeneous dispersion.

At steady state polymerization, in the first reactor, the continuously charged monomer composition containing 1 to 20 percent by weight diene rubber disperses almost instantaneously, under stirring, forming the rubber-monomer particles which on complete polymerization form discrete rubber particles. The conversion of monomers to polymers in the first stage is controlled between 10–50 percent and must have a weight percent level that provides a polymer content in excess of the rubber content of the monomer composition to insure the dispersion of the monomer-rubber phase to a rubber-monomer particle phase having a predetermined size and being dispersed uniformly throughout the monomer-polymer phase.

The rubber particle becomes grafted with a polymer in the first stages which aids its dispersion and stabilizes the morphology of the particle. During the dispersion of the rubber-monomer particles, some monomer-polymer phase is occluded within the particle. The total amount of occluded monomer-polymer phase and grafted polymer present in the particles can be from about 1 to 5 grams for each gram said diene rubber.

The dispersed rubber phase increases the toughness of the polymeric polyblend as measured by its Izod impact strength by Test ASTM D-256-56. It has been found that the impact strength of polyblends increase with the weight percent rubber dispersed in the polyblend in the range of 1 to 20 percent as used in the present invention. The impact strength is also determined by the size of the dispersed rubber particles, with the larger particles providing higher impact strength in the range of 0.5 to 10 microns measured as a weight average particle size diameter with a photosedimentometer by the published procedure of Graves, M. J. et.al., "Size Analysis of Subsieve Powders Using a Centrifugal Photosedimentometer", British Chemical Engineering 9:742-744 (1964). A Model 3000 Particle Size Analyzer from Martin Sweets Company, 3131 West Market Street, Louisville, Kentucky was used.

The weight average diameter of the rubber particles also affects gloss with smaller particles giving high gloss and the larger particles giving low gloss to the fabricated polyblend article such as a molding or sheet product. One must balance impact strength and gloss requirements in selecting an optimum rubber particle size. The range of 0.5 to 10 microns can be used with the range of 0.5 to 5 microns being preferred and 0.8 to 3 microns being most preferred for optimum impact strength and gloss.

Processwise, in the first reactor, one must (1) form and disperse the rubber particle, and (2) graft and stabilize the rubber particle maintaining its size and morphology or structure. The amount of occluded monomer-polymer phase described above is held at a predetermined level described above by steady state polymerization wherein the monomer is converted to polymer, at least a portion of which, grafts to the rubber, stabilizing the rubber particle. It has been found that the higher the amount of occlusion stabilized within the rubber particle the more efficiently the rubber phase is used in toughening the polyblend. The rubber particle acts much as a pure rubber particle if the occlusions are controlled at the amount described above during their stabilization in the initial stages and throughout the total polymerization process. The rubber particle is also grafted externally, stabilizing its structure as to size and its dispersibility in the monomer-polymer phase.

The first reactor forms a polymerization mixture of a monomer-polymer phase having the rubber phase described dispersed therein. The mixture is polymerized further by progressive multistage substantial linear flow polymerizations with the conversion of polymer advancing from about 10–50 percent conversion in the first stage to 50 to 90 percent conversion in the final stage of the staged isobaric stirred reaction zone. This provides a gradual progressive increase of polymer in the monomer-polymer phase. This has been found to be important in maintaining the morphology or structure of the dispersed rubber-monomer particles.

It has been found possible to analyze the amount of total occluded polymer phase and grafted polymers. The final polymerized polyblend product (1 gram) are dispersed in a 50/50 acetone/methyl ethyl ketone solvent (10 ml) which dissolves the polymer phase matrix leaving the rubber phase dispersed. The rubber phase is separated from the dispersion by centrifuge as a gel and dried in a vacuum oven at 50° C. for 12 hours and weighed as a dry gel.

$$\frac{\text{\% Dry gel}}{\text{in Polyblend}} = \frac{\text{Weight of dry gel}}{\text{Weight of polyblend}} \times 100$$

$$\left.\begin{array}{l}\text{\% Graft and}\\ \text{Occlusions}\\ \text{in Rubber}\end{array}\right\} = \frac{\text{\% dry gel} - \text{\% rubber}}{\text{Percent rubber*}} \times 100$$

$$\left.\begin{array}{l}\text{Parts** by weight}\\ \text{of graft polymer}\\ \text{and occluded polymer per unit weight}\\ \text{of rubber}\end{array}\right\} = \frac{\text{\% dry gel} - \text{\% rubber}}{\text{Percent rubber}}$$

*Percent rubber determined by infra-red spectrochemical analysis of the dry gel.
**The present invention preferably has present about 0.5 to 5 grams of occluded and grafted polymer per gram of diene rubber.

The swelling index of the rubber graft particles is determined by taking the dry gel above and dispersing it in toluene for 12 hours. The gel is separated by centrifuge and the supernatant toluene drained free. The wet gel is weighed and then dried in a vacuum oven for 12 hours at 50° C. and weighed.

$$\text{Swelling Index} = \frac{\text{weight of wet gel}}{\text{weight of dry gel}}$$

As described earlier the amount of occlusions and graft polymer present in the rubber particle is present in the amount of about 0.5 to 5 part for each part of diene rubber. The percent dry gel measured above then is the percent gel in the polymerized polyblend and represents the dispersed rubber phase having polymeric occlusions and polymeric graft. The percent gel varies with the percent rubber charged in the monomer composition and the total amount of graft and occluded polymer present in the rubber phase.

The swelling index of the rubber as determined above is important to the final properties of the polyblend. A low swelling index indicates that the rubber has been crosslinked by the monomer as it polymerizes to a polymer phase in the rubber-monomer particle. Generally, the conversion of monomer to polymer in the occlusion follows the rate of conversion of monomer to polymer in the monomer-polymer phase. If the reaction in the second reactor is brought to about 70 to 90 percent conversion rather than 99 to 100 percent conversion the polymerization mixture can be devolatilized separating the residual monomers from the polyblend. The temperatures of the polymerization mixture is raised to about 185° to 250° C. and the monomer vapors are separated to give a finished polyblend. The rubber particles become crosslinked by heating the mixture to from about 150° to 250° C. for sufficient time to crosslink the rubber particles such that they have a swelling index of from about 7 to 20 preferably from about 8 to 16.

Preferably, the polymer of the matrix phase of the polyblends produced by this invention have a dispersion index ($M_w/M_n$), wherein $M_w$ is a weight average molecular weight and $M_n$ is a number average molecular weight, ranging from about 2.0 to 4.0 preferably 2.2 to 3.5. The dispersion index is well known to those skilled in the art and represents the molecular weight distribution with the lower values having narrow molecular weight distribution and higher values having broader molecular weight distribution. The average molecular weight of the polymer of the matrix phase preferable range from 170,000 to 500,000 $M_w$ having a number average molecular weight of from about 50,000 to 200,000 $M_n$.

STAGED POLYMERIZATION

The polymerization after prepolymerization is preferably carried out in a generally horizontal, cylinderical, flow-through, staged, isobaric stirred reaction zone maintaining conditions so as to polymerize said first prepolymerized mixture by progressive multistage substantially linear flow-through polymerization; all said stages operating with shearing agitation and common evaporation vapor phase cooling under isobaric conditions in said reaction zone, providing each said stage with steady state polymerization at controlled temperature, and interfacial liquid contact stage-to-stage establishing a hydraulic pressure gradient from the first stage downstream to the final stage, causing substantially linear flow through said reaction zone; all said stages operating at predetermined conversion levels producing a polymer in said reaction zone having a predetermined molecular weight distribution and average molecular weight maintaining the structural integrity of said dispersed rubber particle, said reaction zone producing a polymerization mixture having a total polymer content being determined by said multi-stage steady state polymerization and evaporation of said monomers.

The reactor operates under controlled isobaric conditions. For the range of temperatures normally of interest for alkenyl aromatic monomers, e.g. styrene polymerization, the operating pressure will range from 6 to 29 psia. The styrene reaction is exothermic, and cooling is provided primarily by vaporization of a part of the monomer from the reacting mass. Further cooling can be provided by jacket. Cooling by the condensed recycle monomer feeding into reaction zone is also provided. The mass is in a boiling condition, and temperature is determined by the natural relationship between vapor pressure and boiling point. This relationship is also a function of the relative amounts of polymer, monomer and other substances (e.g. dissolved rubber, solvents and additives). Since, as material progresses through this reactor, the amount of polymer continuously increases and the amount of monomer correspondingly decreases via polymerization, and monomer content further decreases due to vaporization loss, the temperature progressively increases from inlet to outlet stages.

To accommodate the natural swell of the boiling mass, and to provide space for vapor disengagement, the reactor is usually run at a fillage of about 10 to 90 percent preferably 40 to 80 percent of its volume.

Vapor passes out of the reactor to an external condenser where it is condensed and may also be subcooled. This condensate may then be returned to the inlet compartment of the reactor wherein it is reheated by condensation of a fraction of the previously evolved vapors and mixed with other incoming free materials.

In a multi-compartment staged reactor, each stage is well mixed, and the reaction mass is substantially homogeneous within itself. The discs which separate the stages discourage backflow of material between compartments. The clearance between disc and shell does permit some backflow, and also permits the necessary forwarding of material through the compartments from reactor inlet to outlet giving substantially linear flow.

In a compartmented staged reactor, the first stage has a relatively low conversion level, since it is being continuously fed by monomer solution. However, the rate of conversion in this stage is relatively high because of the high concentration of monomer.

In each succeeding stage, the conversion level is higher than in the preceding one, which tends to lower the rate of conversion. Offsetting this effect, however, are the facts that the temperature is higher, and that monomer is being vaporized out of the mass. Thus, the total conversion to polymer obtained per unit fillage volume of the staged reactor is higher than that which could be obtained in a single stage reactor producing an equal final conversion level at equal temperature.

Clearance between rotating disc compartment baffles and cylindrical wall may be from 1 to 10 percent of shell radius, the larger values being appropriate to the high conversion end of the reactor where viscosity is at maximum. Stage-to-stage forward flow of the polymerizing mixture is through this clearance, and vapor from the polymerizing mixture also counterflow through the clearance, above the surface level of the mass.

The monomer-polymer solution flows through the reaction zone under substantially linear flow, with minimized back mixing, from the first stage to the final stage under a liquid pressure gradient from the first stage to the last stage. Temperature in the reaction zone is controlled by pressure wherein the pressure is regulated to cause the polymerizing solution to boil under its heat of polymerization removing a monomer-vapor phase at a rate sufficient to maintain the temperature of the polymerizing solution at a temperature of from 100° to 180° C. and under isobaric conditions of 6 to 29 psia (4,000–20,000 kg/m$^2$).

The monomer, e.g. styrene, polymerizes giving off about 300 BTU per pound polymerized. The heat of vaporization of styrene is about 150 BTU per pound vaporized, hence, the reactor generally removes about 2 pounds of monomer from the polymerizing syrup per pound of polystyrene converted which is recycled back to the polymerizing first stage at that rate to maintain steady state polymerization under controlled temperature and isobaric conditions.

In operation, the reaction zone can be filled from about 15 to 90 percent of its volume with the polymerizing solution, the remaining volume thereof being occupied by vaporized monomers. A mixture is withdrawn from the last stage of the reaction zone wherein the degree of conversion can range from about 50 percent to as high as 90 percent. The last stages of the reaction zone is generally maintained at higher temperatures (130°–180° C.) than the first reactor of the system producing polymers having average molecular weights in the lower range of 170,000 to 250,000 $M_w$. The combined polymer can have molecular weight range of 170,000 to 350,000 $M_w$. This flexibility affords the ability to produce a wide range of polymers of varying molecular weight distribution and at varying levels of fillage of the reaction zone.

In the operation of the staged reaction zone it is preferred to employ a continuous staged isobaric stirred reactor which is controlled by withdrawal of vaporized monomer above the liquid level maintained therein in order to control the temperature in such second reaction zone. This withdrawn stream of vaporized monomer is condensed in a condenser and collected in a receiver. It can be returned to the first stage of the reaction zone.

A preferred method of control of the reaction zone is the temperature within the final stage of reactor. The control system involves sensing the temperature in the liquid phase in the final stage of reactor and employing a signal so generated to control a temperature controller modified by a signal from a set point generator at a preselected temperature value. The resulting signal modified by a signal generated by sensing the pressure in the vapor phase of said reactor is employed to control a pressure controller which in turn controls a pressure valve in the vent line from the recycled condensed monomer receiver. By so adjusting the pressure above the condensed monomer in the receiver the temperature of the final stage in the reactor is very closely and rapidly controlled to a preselected desired value. The temperature in each stage rapidly achieves an equilibrium value based on the reactor pressure and the polymeric solids content of the polymerizing solution in each stage.

The utilization of the present process gives an overall production process for high impact strength polyalkenyl aromatic polyblends. The polymer, dispersed rubber and monomer mixture called the polymerization mixture comprises the liquid phase effluent from the reactor. Said mixture having a polymeric solids content of from about 50 to about 90 percent by weight is withdrawn therefrom by suitable means such as a gear pump and passed to a heating and devolatilization zone or zones.

One zone of devolatilization can be operated at pressures below atmospheric, or degrees of vacuum. However, the process of the present invention can be operated by the use of two or multiple zones of devolatilization as desired. In the process outlined the vaporized alkenyl aromatic monomers as well as low oligomers thereof are removed from the first devolatilization zone, condensed and passed to a receiver. From the receiver a stream of the condensed monomers and oligomers can be recycled to the first stage of the reactor. Likewise, the monomers and oligomers vaporized in a second devolatilization zone generally operated at somewhat lower pressure than the first are withdrawn, condensed and passed to a receiver. From this receiver a stream of condensed monomers and oligomers can also be recycled to the reactor. Preferably, the oligomers vaporized in either devolatilization zone can be separated from the vaporized monomer by distillation and separately recycled to the reaction zone or purged from the process.

In the production of certain of the desired polymers it has generally been found advantageous to add certain high boiling organic compounds to the polymers produced and the addition is preferably made during polymerization. These additives include internal lubricants such as mineral oil or other heavy oil and mold release agents such as fatty acids, fatty acid esters or salts and waxes. These additions can be conveniently made to the reaction zone and are preferably made to the last stage by means of the multiple metering pumps.

When operating in the manner described above, the proper control of reactors of the variable fillage type affords one the extremely useful advantage of ability to produce polymers of specific physical properties and molecular weight distribution over a range of capacities of from as low as 30 to as high as 100 percent of design capacity for the single production facility described. This flexibility in useful capacity is highly desirable to afford ready response to changes in market demand for total polymers or in the market percentage for various polymers produced in such a production facility.

The following examples are set forth to illustrate more clearly the principles and practice of this invention to one skilled in the art. They are not intended to be restrictive but merely illustrative of the invention herein described. All parts are by weight unless otherwise indicated. All molecular weights are in weight average values unless otherwise noted.

EXAMPLE 1

Rubber solutions comprising 95 parts styrene and 5 parts of a polybutadiene rubber were prepared. The solutions were purged for 2 hours with nitrogen to remove dissolved oxygen. Kinetic studies were made at conversions of 10 to 40 percent of the styrene monomer wherein the major percentage of grafting occurs, i.e., about 65 percent. Here, grafting rates are more accurately studied in that high viscosity and gel effects do not effect the polymerization and grafting rates. Experiments have shown that mass polymerization conversions of 10 to 50 percent places about 65 percent of the graft whereas the remaining conversion of 50 to 100 percent places about 35 percent of the graft. Hence, grafting efficiency is critical in the earlier stages of mass polymerization and provide the purest system for studying the grafting efficiency of a mass polymerization process.

The solutions were thermally mass polymerized in 2.5×20 cm. tubes with agitation. The agitator was a 0.6 cm. glass rod having 1.5×0.3 cm. disks spaced every 2.5 cm. along the rod. As the rods moved through the pressure tight gasket, shear rates of less than 10 sec.$^{-1}$ were induced in the solution at 4 cycles/sec. Conversions were measured by precipating the polymerized polymer in methanol/water solutions followed by filtration and vacuum drying of the precipated polymer. Polymer molecular weights were measured by intrinsic viscosities in toluene at 25° C. using the formula:

$$[n] = 1.7 \times 10^{-4} M^{0.69}$$

The graft levels were determined by the test already described using acetone/methyl ethyl ketone to separate the grafted rubber phase from the polymer phase.

The nitrogen purged solution was polymerized at 130° C. for 1 hour and cooled quickly for analysis of polymer molecular weight and percent graft which includes the graft taking the form of occlusions or internal graft as contained in the rubber particles.

Analysis showed that the conversion was about 20 percent and the rubber phase contained about 70 percent graft by weight based on the rubber with the molecular weight of the matrix polystyrene phase being about 382,000 $M_w$. It is evident from the data that the percent graft is relatively low and the molecular weight of the polymer is relatively high showing a low degree of chain transfer with the rubber for grafting efficiency.

EXAMPLE 2

The procedures of Example 1 were repeated using ethylene gas as a aliphatic mono-olefinic compound to purge the rubber solution. The solubility of ethylene in styrene-rubber solution was found to be about 0.04 percent by weight based on the solution at 130° C. and 3 atmospheres as polymerized.

Analysis showed that the conversion was about 20 percent and the rubber phase contained about 220 percent graft by weight based on the rubber with the molecular weight of the matrix polystyrene being 345,000. It is evident from the data that the ethylene aliphatic mono-olefin compound when dissolved in minor amounts in a rubber/monomer solution provides an unexpectedly efficient and high grafting process for the mass polymerization of solutions comprising a monoalkenyl aromatic monomer having a diene rubber dissolved therein. It is evident that the olefin compound forms free radicals with said alkenyl aromatic monomer that are more active in chain transfer with said rubber than the alkenyl aromatic monomer alone increasing the grafting level of said polymer molecules to said rubber phase.

EXAMPLE 3

The procedures of Example 2 were repeated using propylene and butene-1 as olefinic compounds. The solubility of propylene was found to be about 0.3 percent by weight based on the solution with butene-1 being 1.0 percent by weight both at 130° C. and 3 atmospheres.

Analysis showed that propylene provided a graft level of about 220 percent graft based on said rubber and a polystyrene molecular weight of 338,000 $M_w$. The butene-1 provided a graft level of 140 percent and a molecular weight of 288,000 $M_w$.

EXAMPLE 4

The procedures of Example 1 were used with nitrogen purging to remove oxygen followed by dissolving 5 percent by weight, based on said solution, of liquid hexene-1 in said solution as the olefinic compound.

Analysis showed a graft level of 90 percent and a molecular weight of 356,000. It is evident that the higher molecular weight olefinic compounds are not as efficient in producing grafting as the lower molecular weight olefins yet provide some 30 percent greater grafting efficiency than the styrene monomers alone.

EXAMPLE 5

Example 4 was repeated using vinyl acetate, dissolving 5 percent by weight in the rubber solution. Analysis showed the graft level to be about 180 percent based on the rubber with the polystyrene matrix phase having a molecular weight of about 330,000 $M_w$.

It is evident that the substituted olefins that do not polymerize readily with themselves have the ability of polymerizing with styrene free radicals and forming very active free radicals that give very efficient chain transfer with rubber to give improved and efficient rubber grafting.

EXAMPLE 6

A monomer-rubber solution consisting of 8 parts by weight of stereospecific polybutadiene rubber in 92 parts by weight of styrene monomer is prepared by agitating the mixture at 40° C. for 8 hours. The rubber used contains approximately 35 percent cis-1,4 structure; approximately 55 percent trans-1,4 structure, and approximately 10 percent vinyl-1,2 structure having a Mooney viscosity of the rubber (ML-4, 212° F.) as 55. To the above monomer composition is added 0.5 parts of white mineral oil, 0.1 part by weight of octadecyl 3-(3',5'-di-tert-butyl-4-hydroxyphenyl) propionate and 40 parts by weight of recycled styrene monomer. This monomer composition is fed continuously at approximately 145 lbs./hr. to a 100-gal. anchor-agitated initial reactor operated at approximately 50 percent fillage and 124° C. under 5 psig. nitrogen pressure. The agitator is approximately 31 inches wide and turns at 65 rpm. A first mixture containing approximately 28 percent polystyrene is pumped from the above reactor at a continuous rate such as to maintain essentially constant fillage therein and flows to the inlet of the second reactor, a staged isobaric stirred reactor. The second reactor has approximately a 50 gal. capacity and operates at about 40 percent fillage.

The reactor is about 53 inches long. The agitator consists of a horizontal shaft on which are fixed a series of paddles about 2 inches wide alternating at right angles to one another in a manner similar to that shown in FIG. 1. Along the shaft and rotating with it are four circular discs with an average radial wall clearance of about three-eighth inch rotating at 15 rpm. These discs are positioned to divide the reactor into five stages of approximately equal volume. The pressure in this reactor is maintained at approximately 20 psia.

The second mixture in the final stage is maintained at about 166° C. and contains about 62 percent polystyrene. Styrene vapor evaporated from the second reactor is condensed and the condensate is returned to the first compartment. The second mixture is pumped continuously from the final stage at a rate to maintain essentially constant fillage in the second reactor and is delivered to the inlet of the devolatilizer preheater. The second mixture exits from the preheater at approximately 240° C. and enters a devolatilizer chamber maintained at 50 torr. Second mixture volatile vapors exiting the devolatilizer chamber are condensed and recycled to the first reactor preheater feed system. Approximately 3 lbs./hr. of the condensed devolatilized vapors are withdrawn as purge. The devolatilized melt is fed from the devolatilizer chamber to an extruder which forms it into a plurality of strands which are then cooled and cut into pellets.

| Typical Properties | |
|---|---|
| Izod impact ½" × ¼" bar 73° F. (ft.lb./in.) | 1.3 |
| Tensile strength at yield (lb./in.) | 3800 |
| Tensile strength at fail (lb./in.) | 3750 |
| Tensile elongation at fail (%) | 33 |
| Swelling index | 9 |
| Parts graft and occlusions/rubber | 1.43:1 |
| Rubber particle size (microns) | 1.5 |

It is to be noted that the first reactor was run at 124° C. and the second reactor at about 166° C. with the first reactor making a higher average molecular weight first polymer and the second reactor making a lower average molecular weight second polymer. The preheater of the separator step was run at 240° C. causing crosslinking of the rubber phase giving the rubber phase a swelling index 9. Some low molecular polymer may be formed during the heating and separation steps. The combined polymer of the rigid phase is found to have an average molecular weight of about 240,000 $M_w$ and a dispersion index of 3.1 representative of the molecular weight distribution. The rubber particles have a desirable morphology having a particle size of 1.5 microns and having a graft and occlusion level to rubber ratio of 1.43 to 1.0.

EXAMPLE 7

Example 6 is repeated using an ethylene gas purge during the last two hours of rubber dissolving followed by polymerizing in the initial reactor under an ethylene pressure of 5 psig. The rubber solution during polymerization contained about 0.05 percent by weight of dissolved ethylene. Analysis of the polyblend had the following properties:

| | |
|---|---|
| Izod Impact | 2.1 |
| Tensile Strength at yield | 4400 |
| Tensile Strength at fail | 4200 |
| Tensile Elongation at fail (%) | 49 |
| Swelling index | 13 |
| % Graft and | |

| -continued | | |
|---|---|---|
| Occlusions/rubber | 2.5 | (250% graft) |
| Rubber particle size (micron) | 1.2 | |

It is evident from Example 7 that the graft level is considerably higher using a olefinic compound dissolved in the monomer/rubber solution during mass polymerization. The higher graft level provides improved physical properties to the polyblend by increasing impact strength and elongation at fail.

What is claimed is:

1. An improved process for the mass polymerizing of a solution comprising a monoalkenyl aromatic monomer having a diene rubber dissolved therein wherein the improvement comprises:

A. dissolving a minor amount of from about 0.01 to 5% by weight of ethylene in said solution, B. mass polymerizing said solution at temperatures of from about 80°–180° C., with agitation, C. forming polymer molecules of said monomers as a matrix phase having dispersed therein a diene rubber phase as rubber particles grafted with and having occluded at least a portion of said polymer molecules, said olefin compound being selected such that, during polymerization, said olefinic compound forms free radicals with said monoalkenyl aromatic monomer that are more active than a monoalkenyl aromatic free radical in chain transfer with said rubber increasing the grafting of said rubber with said polymer molecules.

* * * * *